United States Patent
Verma et al.

(10) Patent No.: US 12,067,348 B1
(45) Date of Patent: Aug. 20, 2024

(54) INTELLIGENT WEBPAGE UI OPTIMIZATION LEVERAGING UI AND VIEWER EXTRACTION TELEMETRY

(71) Applicant: Bank of America Corporation, Charlotte, NC (US)

(72) Inventors: Sandeep Verma, Gurugram (IN); Nandini Rathaur, Mumbai (IN); Pavan Chayanam, Alamo, CA (US); Srinivas Dundigalla, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/230,230

(22) Filed: Aug. 4, 2023

(51) Int. Cl.
  *G06F 40/151* (2020.01)
  *G06F 3/01* (2006.01)
  *G06F 40/14* (2020.01)

(52) U.S. Cl.
  CPC ............ *G06F 40/151* (2020.01); *G06F 3/013* (2013.01); *G06F 40/14* (2020.01)

(58) Field of Classification Search
  None
  See application file for complete search history.

(56) References Cited

U.S. PATENT DOCUMENTS

| | | | |
|---|---|---|---|
| 8,402,376 B2 | 3/2013 | Argue et al. | |
| 8,712,953 B2 | 4/2014 | Beringer et al. | |
| 9,471,553 B2 | 10/2016 | Ligman et al. | |
| 9,870,716 B1* | 1/2018 | Rao | H04N 21/2353 |
| 9,979,500 B2 | 5/2018 | Raman et al. | |
| 10,198,143 B2 | 2/2019 | Desai et al. | |
| 10,249,263 B2 | 4/2019 | Hendry et al. | |
| 10,732,721 B1* | 8/2020 | Clements | B66B 1/468 |
| 10,880,549 B2 | 12/2020 | Greenebaum et al. | |
| 11,163,542 B2 | 11/2021 | Sullivan et al. | |
| 2014/0125581 A1* | 5/2014 | Chitkara | G06Q 10/06 345/156 |

(Continued)

FOREIGN PATENT DOCUMENTS

| EP | 1986369 | 3/2012 |
|---|---|---|
| KR | 10-1086570 | 11/2011 |

OTHER PUBLICATIONS

Kwang-Yong Kim et al., "Eyeball Tracking and Object Detection in Smart Glasses," IEEE Xplore, Jun. 1, 2023.

(Continued)

*Primary Examiner* — Toan H Vu
(74) *Attorney, Agent, or Firm* — Weiss & Arons LLP

(57) ABSTRACT

Smart glasses may be used for intelligent UI webpage optimization leveraging UI and viewer extraction telemetry. The smart glasses may include an eyeball tracking device. Methods may include tracking the movement of the eye of a user on the UI webpage. Methods may further include capturing a segment of data within the movement of the eye of a user on a UI webpage and storing the segment of data in memory on the smart glasses. Methods may also include updating the UI webpage based on an instruction in the data segment transmitted to the UI. Additionally, methods may include autofilling the data segment at the point of user eye movement on the UI webpage. Eyeball movement data may transfer from the smart glasses to UI webpage code.

20 Claims, 10 Drawing Sheets

(56) References Cited

U.S. PATENT DOCUMENTS

2017/0124385 A1\* 5/2017 Ganong ................. G06F 16/50
2021/0020159 A1\* 1/2021 Tran ....................... G10L 13/00

OTHER PUBLICATIONS

Julia Calderone, "Eye Tracking in Google Glass: A Window into the Soul?" Scientific American, A Division of Springer Nature America, Inc., Jan. 1, 2015.

\* cited by examiner

INTELLIGENT WEBPAGE UI OPTIMIZATION LEVERAGING UI AND VIEWER EXTRACTION TELEMETRY

FIELD OF TECHNOLOGY

Aspects of the disclosure relate to systems and methods for use of viewer extraction telemetry. In particular, the disclosure relates to systems and methods for user interface ("UI") and viewer extraction telemetry for intelligent webpage optimization.

BACKGROUND OF THE DISCLOSURE

Most UI applications have one or more webpages or portions on a webpage that users rarely visit or read. UI application webpage portions may be termed "segments." Unvisited UI application webpage areas may be referred to as "dead segments." Business teams, organizations, and specifically, the advertisement industry, want to ascertain the most noticed pages or segments on pages, and the fastest, most effective ways to display ads to their customers. Further, UI designers and developers want to ascertain the most noticeable segments on UIs to place the most active and important UI block elements. In addition, these same entities also want to ascertain UI application "dead segments" to monitor, modify, and remove them.

Currently, there is no method available to rank a UI application, its webpages, and different segments on each webpage, from high to low order of corresponding readability, visibility, or noticeability index.

SUMMARY OF THE DISCLOSURE

The present disclosure provides systems and methods that use UI and viewer extraction telemetry to track a user's eyeball movement over a UI webpage, for intelligent webpage optimization. Further provided are systems and methods for use of smart glasses with eyeball tracking capabilities to accomplish UI webpage viewer extraction telemetry. In addition, the smart glasses may measure data about a user's eyeball movement, including time spent viewing a UI block element in a UI webpage, and a user's view order on a UI webpage. The present disclosure also provides smart glasses and methods to track eyeball movement to determine parts and/or segments of a UI webpage a user may read or view. Finally, systems and methods are provided to intelligently update back-end UI webpage code with information collected from a smart glasses user. A UI may include a screen or any other user interface.

Smart glasses may include a frame supporting one or more lenses, a processor embedded in the frame, a wireless communication interface embedded in the frame, a power source for powering the communication interface and the processor, and a sensor configured to capture a user eye position. The smart glasses may also include a non-transitory memory.

Executable instructions, when executed by a processor, may capture a sequence of user eye positions with a sensor and transmit the sequence of user eye positions to a smart glasses interface using a wireless communication interface.

Back-end UI webpage code on smart glasses may be intelligently updated based on eyeball movement and navigation. Back-end UI webpage code may be located on a terminal at a data center in communication with the smart glasses or may be located on the smart glasses. Further, there may be an artificial intelligence ("AI") mode in which an updated back-end code may alter the UI to display a user navigation pattern in connected graphs.

The method includes using an eyeball tracking application for intelligent UI webpage optimization leveraging UI and viewer extraction telemetry. The method may help UI developers understand what a user is viewing on a UI webpage and, accordingly, optimize UI webpages for content and navigation. UI and viewer extraction telemetry may be defined as the automatic measuring of user view data over a UI, and wireless transmission of that data from a remote source.

A UI webpage may be viewed as a plurality of virtual blocks on a grid superimposed onto a UI. A virtual block may include one or more UI block elements. A UI block element may be a rectangular block inside a grid superimposed onto a UI webpage. The UI block element may contain content and information regarding grid location.

Telemetry may be collected from eyeball tracking technology, e.g., augmented reality ("AR") eyeball tracking, and may be sent to a database for aggregation. Each UI block element on a UI webpage and its back-end UI block element code underlying the UI webpage may be ranked. The method may include data mining at the granular level and using the collected data to characterize user view preferences.

User view preferences may be based on, for example, dictionary words, font size, color, image/text, cascading style sheets ("CSS") of a UI block element, and states of neighboring UI block elements. CSS is a style sheet language used for describing the presentation of a document written in a markup language such as HTML or XML.

The disclosed method may use AR technology for eyeball tracking to optimize a UI for various applications. AR technology may include displaying an image as a hologram, as a three-dimensional entity in space, or as light held in space. AR eyeball tracking may include displaying an image of an eyeball viewing an object in space and displaying an image of eyeball viewing portions of a UI webpage, e.g., UI block elements.

The smart glasses may include an eyeball tracking device. The eyeball tracking device may connect to or may be incorporated into the smart glasses. Alternatively, the eyeball tracking device may be located separate from the smart glasses. The smart glasses may include a camera operable to capture data from a user's eyeball movement. The smart glasses may further include a memory unit for storing data captured from the camera.

The smart glasses may also include a sensor configured to capture the user's eye movements. The smart glasses may further include an antenna configured to enable radio frequency communication. The smart glasses may include a processor operable to capture, store and transmit data to a UI webpage. A UI webpage may be any UI page that may or may not be connected to WiFi or the Internet.

A user may view a UI webpage with a pair of smart glasses. The smart glasses may obtain data from a user's eye movement and convert that data into back-end code for the UI webpage to incorporate. For example, a user may view a first UI block element on a UI webpage for five seconds. Then, view a second block element for four seconds. And then, view a third block element for three seconds. The data obtained by the smart glasses may be incorporated into the UI webpage code for further UI updating and optimization.

Another example of the present disclosure may include using an eyeball tracking device, eyeball tracking application, or smart glasses to update UI webpage code in real time with data obtained from a user viewing UI block elements on a UI webpage.

The smart glasses may transmit the data segment including any associated eyeball movement data and may update the UI webpage code to incorporate the data segment at the point of user's eyeball movement on the UI block element. The transmission by the smart glasses may be via an eyeball tracking application or via any other means.

The smart glasses may update the UI webpage code by autofilling the data segment at the point of user's eyeball movement on the UI block element. The UI webpage code may be updated such that the UI webpage code for the UI block element is updated with information about the user eyeball movement. This information may include, e.g., view time, view order, and content viewed.

The smart glasses may be configured with a camera that utilizes a scattering waveguide holographic optical element ("HOE") to display light to an eye. HOEs are holograms that duplicate the performance of optical components, such as lenses. A hologram may be used to transform the properties of a waveguide. Typically, in AR systems, light is coupled to the waveguide using a hologram. The waveguide is then used to transmit relevant information from a display to an eye. The waveguide is mostly transparent and does not block light from the real world.

The smart glasses may be configured to produce an eyeball image representing the user's eyeball movement. The smart glasses may also be configured to produce an eyeball image representing the user's eyeball movement using hue, saturation, and value ("HSV") color space.

Further, the smart glasses may be configured to produce an eyeball image representing the user's eyeball movement using HSV color space. Then, a contour may be applied to the eyeball image to determine whether an eyeball tracking area over the user's eyeball movement is equal to a threshold circular area.

A threshold circular area may be, for example, 0.001-1000 $mm^2$. The threshold circular area may preferably be, for example, 1-10 $mm^2$. The threshold circular area may also be an approximate integer number, for example, approximately 1, 2, 3, 4, 5, 6, 7, 8, 9, or 10 $mm^2$.

The smart glasses may extract a user eyeball center position. Then, the user eyeball center position may be used to recenter the UI webpage. The user eyeball center position may also be used by an eyeball tracking application to recenter the smart glasses.

The smart glasses may display location and observed object information, e.g., a UI block element, in a viewing image on the UI webpage. For example, a location of an observed object could be a grid location superimposed onto a UI webpage. Information about an observed object could be the content of the observed object, e.g., the content of a UI block element.

The smart glasses may recalculate an eyeball center position, by making an adjustment for user eyeball and head movement, a reference position and depth between an observation and an object, and surrounding environment including lighting and noise.

The smart glasses and/or UI may be configured with a grid display represented by rows and columns of dotted lines. The grid display may be superimposed over the smart glasses. The grid display may be superimposed over the UI webpage. The grid display may be divided into UI block elements.

The UI webpage may be incorporated with the UI block elements comprising the VO, the TS, and a navigation pattern. The UI webpage may be incorporated with a smart glasses data feed including, but not limited to, user eyeball position, and user eyeball movement including time spent on each virtual grid cell. The UI webpage may be incorporated with a system and browser data feed including, but not limited to, machine resolution, browser zoom level, browser window size, horizontal and vertical scroll position, and page ID.

A processor may be configured to update the UI webpage by autofilling the data segment at the point of eyeball movement at the UI webpage. A system may be provided for detecting the movement of a user's one or more eyes on a UI. A system may be provided for, in response to the detection, triggering a tracking of the movement of the user's one or more eyes. A system may be provided for capturing a data segment within the movement of the user's one or more eyes. A system may be provided for storing the data segment in memory on the smart glasses.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

The present disclosure relates to smart glasses that assist in ranking webpages or segments of a UI application to optimize a UI, and generate readability, visibility, and noticeability rankings for virtually created, smaller segment blocks (e.g., UI block elements) on a UI. This ranking may enable placement of significant information or advertisements on specific UI block elements.

In this application, the terms "smart device," "smart lens," "smart lens device," "smart glasses," and "smart glasses device" may all be used interchangeably with each other. Further, the terms "user" and "viewer" may also be used interchangeably.

Figure 5:
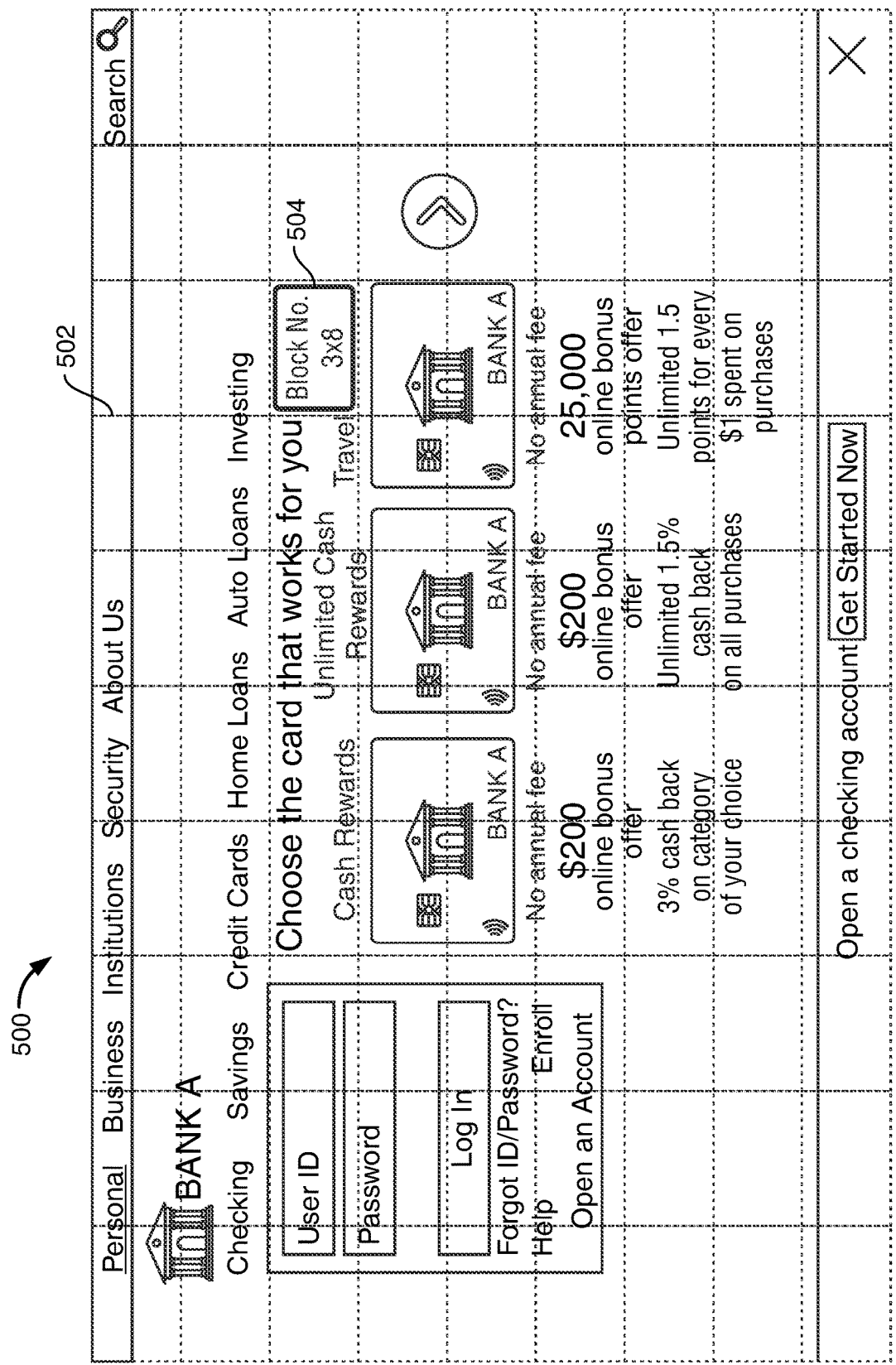
FIG. 5 shows illustrative systems and methods in accordance with principles of the disclosure.

The method may include the following steps. A pair of smart glasses may create virtual grid blocks on a UI webpage. These virtual grid blocks may also be referred to as "UI block elements." Using a UI webpage with 1920× 1080 resolution, if this UI webpage is split into UI block elements of 10×10, then each UI block element size would be 192×108. A sample of a UI block element on a 9×10 UI webpage is illustrated in FIG. 5.

Smart glasses may then capture the current user viewing frame and eyeball position and mark the UI block elements currently being viewed, including associated information. UI block elements include UI webpage content and other information such as grid location.

Eyeball tracking application software may also capture several properties from the system, including, but not limited to, UI resolution, vertical and horizontal scroll position, UI webpage, and document object model ("DOM") of the UI webpage.

Information collected from the above steps may then be combined to precisely identify a UI block element currently viewed by a user, as well as its associated properties.

Statistics collected from the above steps may be sent to a database for aggregation and ranking of each UI block element on a UI webpage and actual UI block element code in UI webpage code. Each UI block element on a UI webpage is supported by back-end UI block element code on a terminal, server, or smart device.

The aggregated data may also be sent for data mining at an even more granular level to characterize viewer preferences based on dictionary words, font size, color, image/text, CSS of a UI block element, state of the neighboring UI block elements, etc.

Smart glasses may be configured for wearing on a user. For example, the smart glasses may be adjusted to the way a user wears them. For the purposes of this disclosure, the smart glasses may be understood to mean an interactive glasses. Smart glasses may be made from materials used for wearable glasses such as soft and pliable plastic.

The smart glasses may include one or more internal processors. The one or more internal processors may include one or more processors. The smart glasses may also include hardware components associated with conventional smart devices. The smart glasses may include a camera. The camera may be operable to capture data from a user's eyeball movement. The smart glasses may include a memory unit. The memory unit may be for storing the data captured from the user's eyeball movement.

The smart glasses may include one or more sensors. The sensors may be configured to capture a user's eye movements. Sensors may include a camera. Sensors may also include radio sensors, infrared sensor, and/or a light sensor. These electronic sensors may be configured to measure changes in light reflected off a user's eye. The smart glasses may be configured to use these measurements and translate them into control instructions. The smart glasses may include an antenna. The antenna may be a loop antenna. The antenna may be configured to enable radio frequency communication.

Smart glasses may include light fidelity ("LiFi") capabilities. The smart glasses may include a light emitting diode ("LED"). The LED may be attached to a substrate on the smart glasses. The LED may be connected to a controller and/or a processor. The LED may be operable to transmit data captured to/from the smart glasses and to/from the UI webpage. The LED may also be operable to transmit data to/from additional computing devices.

LiFi is a two-way network protocol for high-speed connectivity using light technology. LiFi is a light-based communication system capable of transmitting data wirelessly at high-speed using light emitting diodes ("LEDs"). LiFi transmission speeds may be more than one hundred times faster than conventional WiFi. LiFi infrastructure is also relatively simple, in contrast with the radio transmitters and antennae required for WiFi communications. The speed of LiFi transfer may enable real-time parallel processing of large-scale files, vastly improving processing efficiency. The speed of LiFi transmission may also limit data leakage and thus protect against adversarial attacks during the data transmission process.

LiFi may capture data in modulated light frequencies. The driver-circuit in LED bulbs may encode and transmit data by switching the LED on and off at rates so fast that the flickering is indiscernible to the human eye. The data may be decoded by an optical sensor on the receiving end and converted back into an electronic data stream.

In some embodiments, LED bulbs may be dimmed to levels below human visibility while still emitting enough light to carry data. LiFi technology presents several advantages over conventional WiFi. One advantage is transmission speed. LiFi transfers may occur at speeds 100 times faster than conventional WiFi.

Another advantage of LiFi is capacity. WiFi relies on the radio frequency spectrum which is subject to congestion and slowing due to high traffic. LiFi, on the other eye, uses the visible light spectrum which is 10,000 times larger than the radio bandwidth and is therefore not limited by spectrum capacity.

While WiFi frequencies may eventually become crowded and slower when large amounts of data are transferred, LiFi is able to deliver consistent large data transfers. Additionally, unlike WiFi, LiFi frequencies may be used in electromagnetic sensitive areas without causing interference. LiFi infrastructure is also relatively simple, in contrast with the radio transmitters and antennae required for WiFi communications.

The limited hardware required for LiFi communications may also improve energy efficiency. The smart glasses may be exposed to light, mechanical movement, and electromagnetic conduction and may harvest energy from these sources. The processor may be operable to capture, store, and transmit data to a UI webpage.

One or more software modules may execute on the processors. The one or more software modules may be stored in a memory located within the smart glasses. The one or more software modules may, in the alternative, be referred to as applications. The applications may enable the smart glasses to execute various tasks.

The processor may execute an eyeball tracking application. The eyeball tracking application may also be referred to as an eye movement tracking application or an eye tracker application. Sensors may be controlled by the eyeball tracking application executed on the smart glasses' processor. Eye position data detected by the sensors may be collected by the eyeball tracking application. Eye position data detected by the sensors may be stored in a memory embedded in the smart glasses. Sensors for tracking user eye position may include cameras. In some embodiments, the cameras may be combined with illuminators. The illuminators may include a near infrared light source or any suitable light source.

One method of tracking user eye position involves eye movement vectoring. Eye movement vectoring is a method for remote, non-intrusive eyeball tracking. A light source illuminates the eye causing visible reflections and a camera captures an image of the reflections. A vector is calculated based on the angles between the eye reflections. The direction of the vector combined with other geometrical features of the reflections may be used to determine eye position. Eye position may include eye movement direction.

The smart glasses may include multiple cameras per eye for increased accuracy in measuring eye movement direction. Smart glasses may include one or more sensors to provide differentiation between eye movements. Smart glasses may include compensation, calibration, and recalibration capabilities.

The system may include a camera associated with the external computing device display. The camera may determine the proximity of the smart glasses to the display. The smart glasses may continuously transmit eye position data to a terminal supporting the UI webpage back-end code while in proximity to the external display. In some embodiments, the smart glasses may transmit the eye position data at periodic intervals.

The smart glasses may terminate or pause the transmission when the smart glasses are no longer within a predetermined proximity to the display. In some embodiments, the smart glasses may terminate or pause the transmission when the sensor fails to detect an eye position associated with eye movement on the display for a predetermined period.

The camera associated with an external computing device may determine the position of the user eye with respect to the display. The user eye position may be periodically or continuously determined. Eye position data from the camera on the external computing device may be synchronized with eye position data from the smart glasses' sensor. The smart glasses camera may include an eye movement sensor. User eye movement direction combined with user eye position may be extrapolated to determine a fixation point of the user's eyes on the display and identify the corresponding UI webpage coordinates on the display.

The external computing device may include a smart glasses interface. The smart glasses interface may receive eye position data from the smart glasses. The smart glasses interface may determine the relevance of the eye position data. The determination may be based on a level of eye movement. Eye position data may be associated with eye movement based on any suitable metric.

Metrics for tracking eye position may include a determination of eye movement points. One eye movement point may equal one raw sample captured by the eye tracker application. Fixation may occur when an eye movement point is maintained at a location for a specific amount of time. Fixation may be associated with eye movement. Fixation may be associated with a threshold level of eye movement.

The eyeball tracking application may be configured to determine the movement of the user's eye on a UI webpage. The movement of the user's eye may be determined when the user's eye is moved in the direction of the UI webpage.

When a user's eye movement is determined to be within range of a UI webpage, the eyeball tracking application is further configured to determine a point of the movement of the user's eye on the UI webpage. The point of movement may be the location on the UI that includes data that the user may want to capture or autofill, such as, for example, data within a data entry field. The point of movement may be directed to a data entry field associated with a data entry field identifier within the UI webpage.

A UI webpage may display a page of a computer application. An application may provide one or more fillable forms. An application may provide one page displayed on the UI. An application may include a plurality of pages. Each page may provide a plurality of data entry fields and associated data entry field identifiers. The data entry field identifiers may be the name of the type of data entry field. The data entry field may include the value of the identifier. At a first UI block element, the value may be included in the data entry field. At a second UI block element, the data entry field may be blank, and values may be filled in using the smart glasses.

The eyeball tracking application may detect eye movement while gazing at a point of movement. In response to the detection, the system may be configured to measure a data segment at the point of eye movement within a block element.

The eyeball tracking application may also be configured to capture a data segment associated with the user's eyeball movement using the camera. The data segment may be stored in the memory of the smart glasses.

Smart glasses, via the eyeball tracking application, may be configured to transmit the data segment to the UI webpage. The LiFi receiver at the UI webpage may be configured to receive the data segment. The LiFi receiver may be included on a photodetector or a camera and upon receipt may be responsible for re-transcribing a luminous signal transmitted by the LED into an operational electrical signal.

A system may be provided for detecting the movement of a user's eyes on a grid display over a UI webpage. A grid display over a UI webpage may be divided into UI block elements. Each UI block element may occupy space on a UI webpage.

A UI webpage may be incorporated with UI block elements including view order ("VO"), time spent ("TS") viewing, and user navigation pattern. The VO is the order in which a user views particular block elements within a UI webpage. TS is the amount of time a user spends viewing each block element within a UI webpage. And navigation pattern is an overall user pattern of VO and TS during a UI webpage view session.

The UI webpage may receive a "smart glasses data feed" including, but not limited to, user eyeball position, and user eyeball movement including time spent on each virtual grid cell. User eyeball position is the position of the user's eyeball relative to the UI webpage as tracked by the eyeball tracking application. The data feed may be transmitted by the smart glasses to an external device or terminal containing the UI webpage back-end code.

The UI webpage may also receive a "system and browser data feed" including, but not limited to, machine resolution, browser zoom level, browser window size, horizontal and vertical scroll position, and page ID. System and browser data feed relate to data that govern the system and browser. For example, machine resolution may be UI resolution. Browser zoom level may be a level of visual zoom into and out of a browser or UI webpage. Browser window size may be the size of the browser or UI webpage. The horizontal scroll position may be a position the UI webpage may scroll in the left/right direction. The vertical scroll position may be a position the UI webpage may scroll in the up/down direction. And page ID may be a page number or name of a UI webpage within a UI application.

Smart glasses may include a housing, a processor disposed in the housing, a reader disposed in the housing and electronically coupled to at least the processor, configured to read eye movements, and a UI disposed in the housing and electronically coupled to at least the processor, configured to display a UI webpage.

Smart glasses may include a transceiver disposed in the housing and electronically coupled to at least the processor, wherein the transceiver may communicate with external transceivers. The smart glasses may include a transceiver disposed in the housing and electronically coupled to at least the processor, wherein the transceiver may receive communication generated by at least one object within the transceiver field, and wherein the at least one object is an individual eye belonging to a user.

Smart glasses may include an analog-to-digital signal converter disposed in the housing and electronically coupled to at least the processor and the transceiver, wherein the signal converter converts transceiver communication to digital data.

Smart glasses may include a non-transitory memory disposed in the housing and electronically coupled to at least the processor, wherein the non-transitory memory stores the analog transceiver communications, stores the digital data, and stores an operating system.

Smart glasses may include a communication circuit disposed in the housing and electronically coupled to at least the processor, wherein the communication circuit may receive and transmit the digital data. The communication circuit may also be configured to communicate with a remote digital signal processor.

Smart glasses may include a remote digital signal processor configured to identify at least one object within a transceiver field, analyze any movement of the at least one object within the transceiver field, and convert the movement of the at least one object into data for UI webpage code.

Smart glasses may include a digital signal processor disposed inside the housing and electronically coupled to at least the processor, the signal converter, and the non-transitory memory, wherein the digital signal processor is configured to identify a user's eye within the transceiver field, analyze a movement of the individual eye within the transceiver field, and convert the movement of the individual eye into a data segment for UI webpage code.

Smart glasses may include a continuous transceiver field while a transceiver is active. Smart glasses may include a transceiver field with a depth of six inches to fifteen feet. Smart glasses may include a pulsed transceiver field. Smart glasses may include a transceiver operating at a frequency of 0.001 GHz to 1000 GHz. Smart glasses may include a communication circuit having a cellular antenna.

Smart glasses may include an encryption controller. Smart glasses may include a non-transitory memory with executable instructions and configured to authenticate a user.

A method may be provided for sensing, at the smart glasses, one or more eye movements. A method may be provided for activating, at the smart glasses, a transceiver. A method may be provided for transmitting, from the transceiver, a transceiver field. A method may be provided for receiving, at a transceiver, transceiver communications from at least one object within the transceiver field. The object within the transceiver field may be, for example, a user's eye.

A method may be provided for digitizing, at the smart glasses, the transceiver communications. A method may be provided for processing, at a digital signal processor ("DSP") at the smart glasses, the transceiver communications. A method may be provided for identifying, at the DSP, at least one target of a user's one or more eyes, wherein the at least one target is all or a portion of the at least one object. A method may be provided for resolving and analyzing, at the DSP, movement of the at least one target of a user's one or more eyes.

Apparatus and methods for smart glasses for UI optimization are provided. The smart glasses may utilize eye movement vectoring via an eyeball tracking application.

Smart glasses may include a housing. In addition to typical smart glasses components (such as, e.g., a UI, frames, lenses, processor, non-transitory memory, encryption and authentication circuit, communication circuit), the housing may include a transceiver system with components including a transceiver, analog-to-digital signal converter, and a DSP. The communication circuit may enable wireless services such as 5G cellular service. Each of these components may be electronically coupled to one or more of each other.

Smart glasses may also include an apparatus to remotely sense and read eye movements. The eyeball motion may be detected by transceiver, electromagnetic radiation waves, or by analyzing stored data contained in a magnetic stripe on a smart chip that is near-field communication ("NFC")-enabled. Alternatively, the smart glasses may sense and translate the eye movements through any other appropriate methods, such as a Wi-Fi or a Bluetooth signal.

The method does not require physical documents. For example, a customer may open a banking application on a mobile phone to initiate a digital document transaction. If the customer is within range of the smart glasses, a view of the banking application on a mobile phone may take the place of a physical document. The document may be viewed on a UI display such as a UI display on a mobile phone. The data sent from the banking application may include necessary information so that the smart glasses may update its UI webpage code without needing a physical document. This updated UI webpage code may include information such as UI block element time spent and view order. Updating may including, for example, appending, deleting, or editing information or data within a UI webpage or UI webpage code.

Furthermore, the smart glasses may utilize AI such that the UI webpage may update its back-end code based on information gathered and aggregated by the smart glasses eyeball tracking application. AI enabled smart glasses and AI enabled UI webpages may integrate information seamlessly to autofill and update back-end UI webpage code located on the smart glasses or on an external terminal or server.

The transceiver may operate at a power up to 1000 W, although lower power outputs may be safer. The higher the power, the more range the transceiver may have. A preferred power level may depend on the preferred range. The transceiver may have a range between 1 inch and 1000 feet.

The DSP may be configured to identify and track the movement of human eyes, retinas, or pupils in space. These movements may be represented by an image in digital space.

The transceiver may be configured to receive light waves reflected off an object such as an eye, an iris, a pupil, multiple eyes, or a different object, and process the light reflections using the digital signal processor. The transceiver may be configured to receive reflections from any large-enough object within the transceiver field. Objects that are too small may not reflect the light waves of the transceiver field. Generally, objects one-half the size of the transceiver frequency may be too small to reflect the transceiver waves. In an embodiment, the transceiver receiver may receive reflections from individual eyes belonging to an eye of a user of the smart glasses.

The analog-to-digital signal converter may convert the received signals to digital data, and the DSP may perform various calculations on the digital data. Such calculations may include light-effect calculations to determine the movement of the object. Other calculations may include range and velocity.

The DSP or feature extraction and translation engine may disregard objects with a size outside of a predetermined range. For example, the DSP or feature extraction and translation engine may disregard any objects with an area that is smaller than 0.1 mm$^2$ or larger than 50 cm$^2$.

The DSP or one or more of the smart glasses' components may be located on a remote server. The smart glasses and/or its components may communicate with the remote server using, for example, Wi-Fi, LAN, WAN, internet connectivity, wireless networks, and/or 5G networks. Using 5G networks and wireless communication protocols may enable faster processing of transaction and authentication requests.

The smart glasses may include a communication circuit. The communication circuit may be configured to transmit and receive data including eyeball movement and viewing data. In alternative embodiments, the communication circuit may include a network interface card ("NIC"), a Bluetooth antenna, a cellular antenna, a wi-fi antenna, or any other appropriate antenna. A 5G-capable cellular antenna and communication circuit may be preferable to increase the speed of the smart glasses' transactions.

The smart glasses may include an encryption controller. The encryption controller may allow for accurately authenticating the user, as well as protecting the user and financial institutions from users with malicious intent and/or fraud. In an embodiment, the non-transitory memory may include executable instructions and at least one datum configured to authenticate the user. These instructions and data may work in concert with, or separate from, any encryption controller.

A user may activate the smart glasses through a banking application instead of eye motion. After the smart glasses are activated, the smart glasses detect the motion of an eye of a customer over a UI, using a transceiver or any other mechanism. The smart glasses may simultaneously enable a UI and display options for a customer to select.

The transceiver field may extend only a few inches away from the smart glasses. The transceiver field may also extend as far as 1000 feet away from the smart glasses. These ranges may be achieved by modulating the power output from the transceiver (i.e., less power equals less range).

As the transceiver field may be generated by a signal, the movement of any discrete scattering centers within the field may create a reflection in the reflected signal. By analyzing the reflection, the DSP/feature extraction and translation engine may track and record the movements of the object(s). Multiple objects may be tracked at any time, although tracking more objects may require more processing power. The movements of the object over time may be converted into a digital image (such as a heatmap, line, curve, or combination thereof). The digital image of the eye movements may be analyzed to identify a focus and direction of gaze. This analysis may be performed using machine or deep-learning algorithms.

The measurement of eyeball movement data may be performed using deep neural machine learning or other algorithms. One or more of these steps may be performed locally at the smart glasses or the data may be transferred to a remote or external server with additional computing power.

The eyeball movement results may be sent back to the smart glasses for further calibration and processing. The digital data transfer (in both directions) may be sent over any suitable communications network, including 5G cellular networks.

The present disclosure utilizes advanced features of smart glasses' such as eyeball tracking and movement on a UI webpage or UI, to illustrate user patterns in navigating information on an application. The smart glasses may also calculate the current UI block element (e.g., HTML and JS block) displayed to the user from various system properties. System properties may include, for example, system resolution, browser zoom level, current size, and scroll positions, and may be combined with the smart glasses data feed. In addition, smart glasses may update each UI block element code with additional AI properties including, but not limited to, height from top, average user view order, and average user time spent.

Further, the smart glasses may illustrate a user navigational pattern and preference ranking for each UI block element from VO (view order) and TS (time spent).

Illustrative embodiments of apparatus and methods in accordance with the principles of the disclosure will now be described with reference to the accompanying drawings, which form a part hereof. It is to be understood that other embodiments may be utilized, and structural, functional, and procedural modifications may be made without departing from the scope and spirit of the present disclosure.

The drawings show illustrative features of apparatus and methods in accordance with the principles of the disclosure. The features are illustrated in the context of selected embodiments. Features shown in connection with one of the embodiments may be practiced in accordance with the principles of the disclosure along with features shown in connection with another of the embodiments.

Apparatus and methods described herein are illustrative. Apparatus and methods of the disclosure may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will understand that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

The smart glasses and the remote server may have one or more computer systems and servers that include one or more of the following hardware components: Input/output ("I/O") circuitry, which may include a transmitter device and a receiver device (or a transceiver device, which is both a transmitter device and a receiver device in a single device) and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system. When run on the smart glasses, each hardware may be a "micro" version. Processors, receivers, transmitters, sensors and cameras and any other suitable hardware may be micro. These elements may relate to FIGS. 1 and 2.

The smart glasses and the remote server may include RAM, ROM, an I/O module, and non-transitory or non-volatile memory. Machine-readable memory may store information in machine-readable data structures. The I/O module may include a microphone, button and/or touch screen which may accept user-provided input. The I/O module may include a speaker for providing audio output and/or a video display for providing textual, audio, and/or graphical output.

Software applications executed by the smart glasses and the remote server may be stored within the non-transitory memory and/or other storage medium. Software applications may provide instructions to the processor that enable the apparatus to perform various functions. The instructions may include any of the smart glasses methods and processes described herein. For example, the non-transitory memory may store software applications such as an eyeball tracking module and data capture module. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Program modules include routines, programs, objects, components, data structures, etc. that perform tasks or implement abstract data types. A computing system may be operational with distributed computing environments where tasks are performed by remote processing devices that are linked through a communications network. In a distributed computing environment, program modules may be in both local and remote computer storage media including memory storage devices. Computing systems may rely on a network of remote servers hosted on the Internet to store, manage, and process data (e.g., "cloud computing" and/or "fog computing").

The smart glasses and the remote server may be part of two or more networks. The smart glasses and the remote server may support establishing network connections to one or more remote computing systems. Illustrative network connections may include a LAN and a WAN. When used in a LAN networking environment, a computing system may be connected to the LAN through a network interface or adapter. A computing system may include a communication circuit. The communication circuit may include a network interface card or adapter.

When used in a WAN networking environment, the smart glasses and the remote server may include a modem, antenna, or other circuitry for establishing communications over a WAN, such as the Internet. The communication circuit may include a modem and/or antenna.

The existence of any of various well-known protocols such as TCP/IP, Ethernet, FTP, HTTP, and the like is presumed, and a computing system may be operated in a client-server configuration to permit a user to retrieve web pages from a web-based server. Web browsers can be used to display and manipulate data on web pages.

Computer systems and servers may include components, such as a display, power source, speaker, and antennas. Components of a computer system and server may be linked by a system bus, wirelessly or by other suitable interconnections. Components of a computer system and server may be present on one or more circuit boards.

Figure 1:
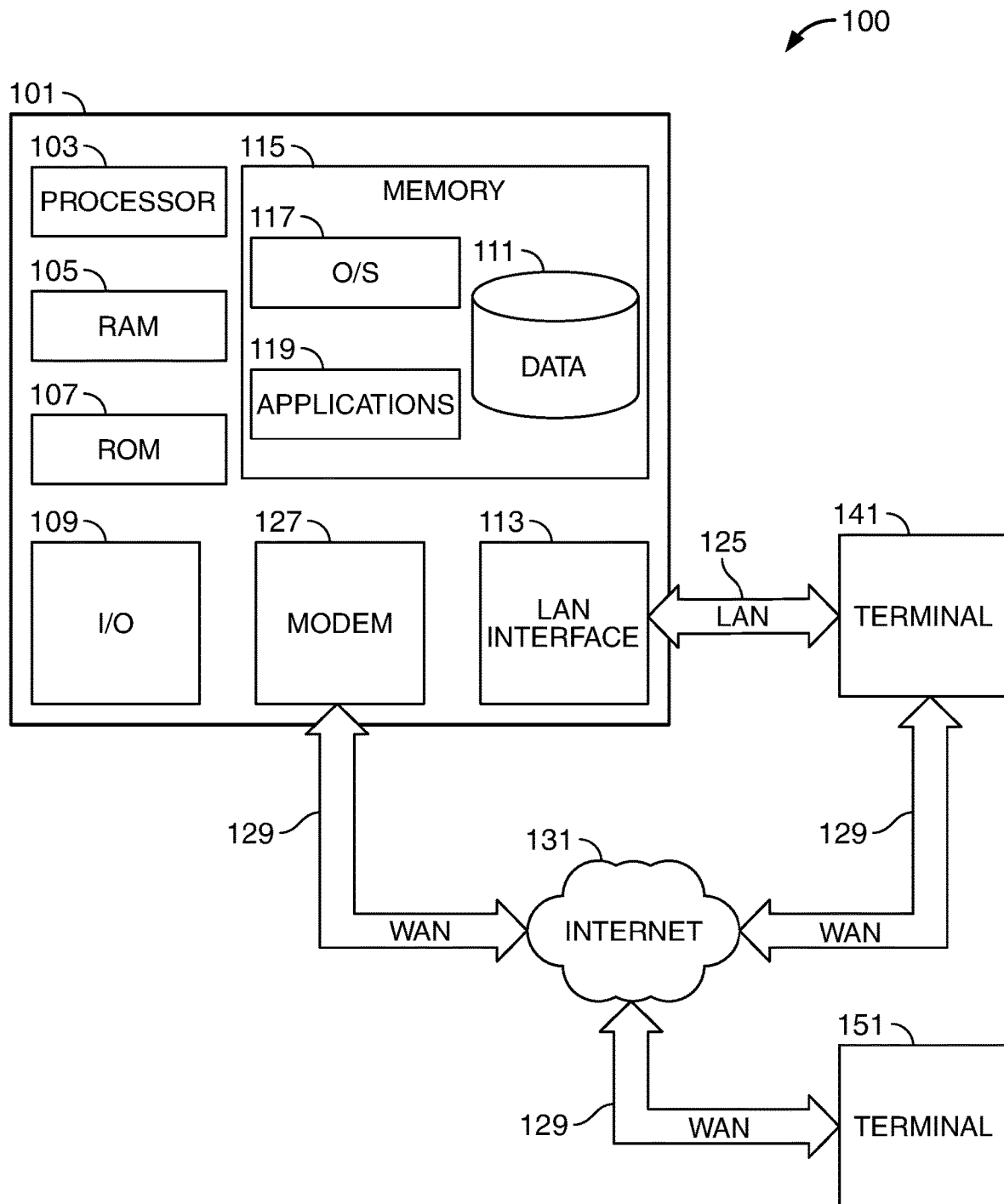
FIG. 1 shows an illustrative system in accordance with principles of the disclosure.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein.

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be made up of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

I/O module 109 may include connectivity to a microphone, keyboard, touch screen, mouse, and/or stylus. One may provide input into computer 101 through these I/O modules. The input may include input relating to cursor movement. I/O module 109 may also include one or more speakers for providing audio output and a video display device for providing textual, audio, audiovisual, and/or graphical output. The input and/or output may be related to computer application functionality.

One may connect System 100 to other systems via local area network ("LAN") interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network ("WAN") 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or application programming interface (API). One may understand that web-based, for this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the present disclosure in the context of computer-executable instructions, such as application program(s) 119, for execution by a computer. Programs may include routines, programs, objects, components, and data structures, which perform tasks or implement data types. One may practice the present disclosure in distributed computing environments. One may perform tasks by remote processing devices, linked through a communications network. In a distributed computing environment, programs may be in both local and remote computer storage media including memory storage devices. One may consider such programs, for this application's purposes, as engines for the performance of the program-assigned tasks.

Computer 101 and/or terminals 141 and 151 may also include various other components, such as a power source, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The disclosure may be operational with numerous other general purpose or special purpose computing system environments or configurations. Non-limiting examples of well-known computing systems, environments, and/or configurations that may be suitable for use with the disclosure include: personal computers, server computers, eye-held or laptop devices, tablets, mobile phones, smart phones and/or other personal digital assistants ("PDAs"), multiprocessor systems, processor-based systems, cloud-based systems, programmable consumer electronics, network PCs, mini-computers, mainframe computers, distributed computing environments that include any of the above systems or devices, and the like.

Figure 2:
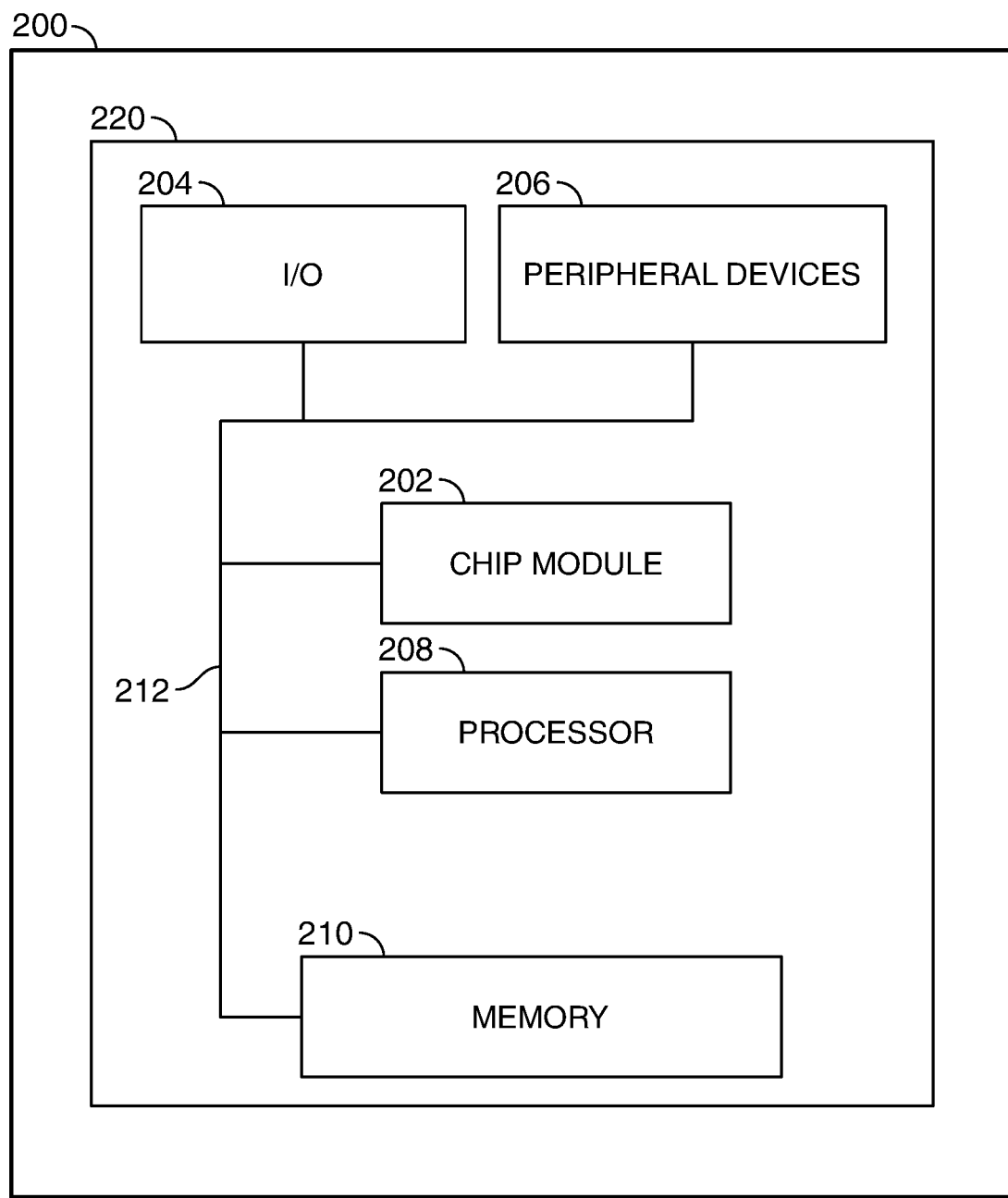
FIG. 2 shows an exemplary diagram in accordance with principles of the disclosure.

FIG. 2 shows an illustrative block diagram of apparatus 200. One may configure apparatus 200 in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: (1) I/O circuitry 204 may include a transmitter device and a receiver device and may interface with fiber optic cable, coaxial cable, telephone lines, wireless devices, PHY layer hardware, a keypad/display control device, or any other suitable media or devices. (2) Peripheral devices 206 may include counter timers, real time timers, power-on reset generators, or any other suitable peripheral devices. (3) Logical processing device 208 may compute data structural information and structural parameters of data. And (4) machine-readable/writeable memory 210 may also be included.

One may configure machine-readable/writeable memory 210 to store information in machine-readable/writeable data structures, such as: machine executable instructions (for example, "computer instructions" or "computer code"), applications, signals, and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
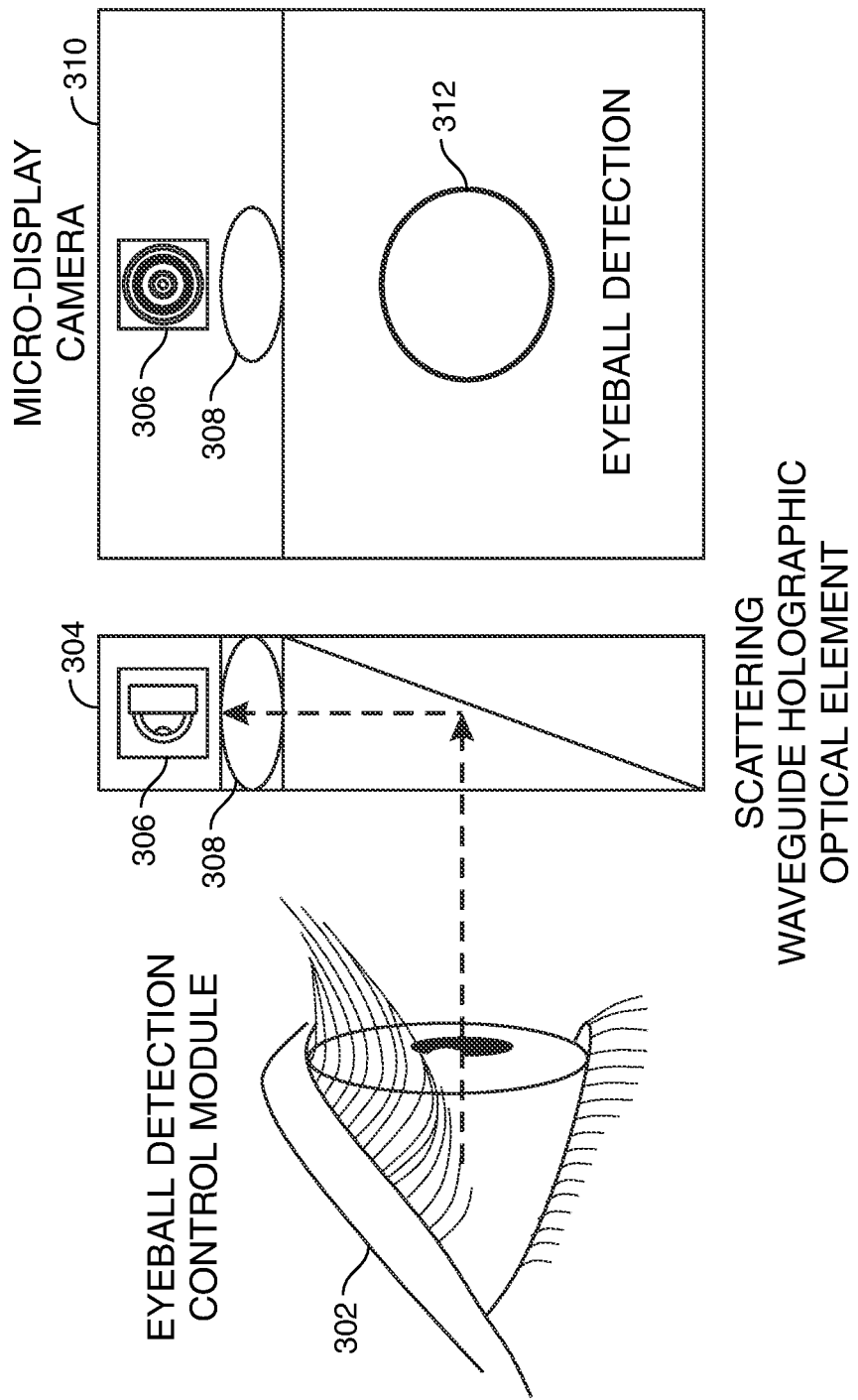
FIG. 3 shows an illustrative diagram in accordance with principles of the disclosure.

FIG. 3 shows an illustrative process schematic of a method for eyeball detection that detects an eyeball region through the scattering waveguide of a holographic optical element ("HOE"), and displays this region through a display, in accordance with the principles of the disclosure. FIG. 3 contains both illustrative steps and numbered components.

A smart glasses device (display camera) 310 and scattering waveguide HOE 304 may each include smart glasses 306 and a holographic optical element 308. User 302 looks through holographic optical element 308, and then the smart glasses 306 detects an eyeball region. The ensuing eyeball detection 312 may be transferred to a UI webpage or UI.

The smart glasses display camera 310 uses HOE 304 and holographic optical element 308 to transform the properties of a wavefront. Light is coupled to the waveguide using the holographic optical element 308, which is used to transmit relevant information from a UI webpage display to an eye of user 302. Light reflected from the eye of user 302 off of a UI webpage display may also be detected and analyzed by an eyeball tracking application.

Figure 4:
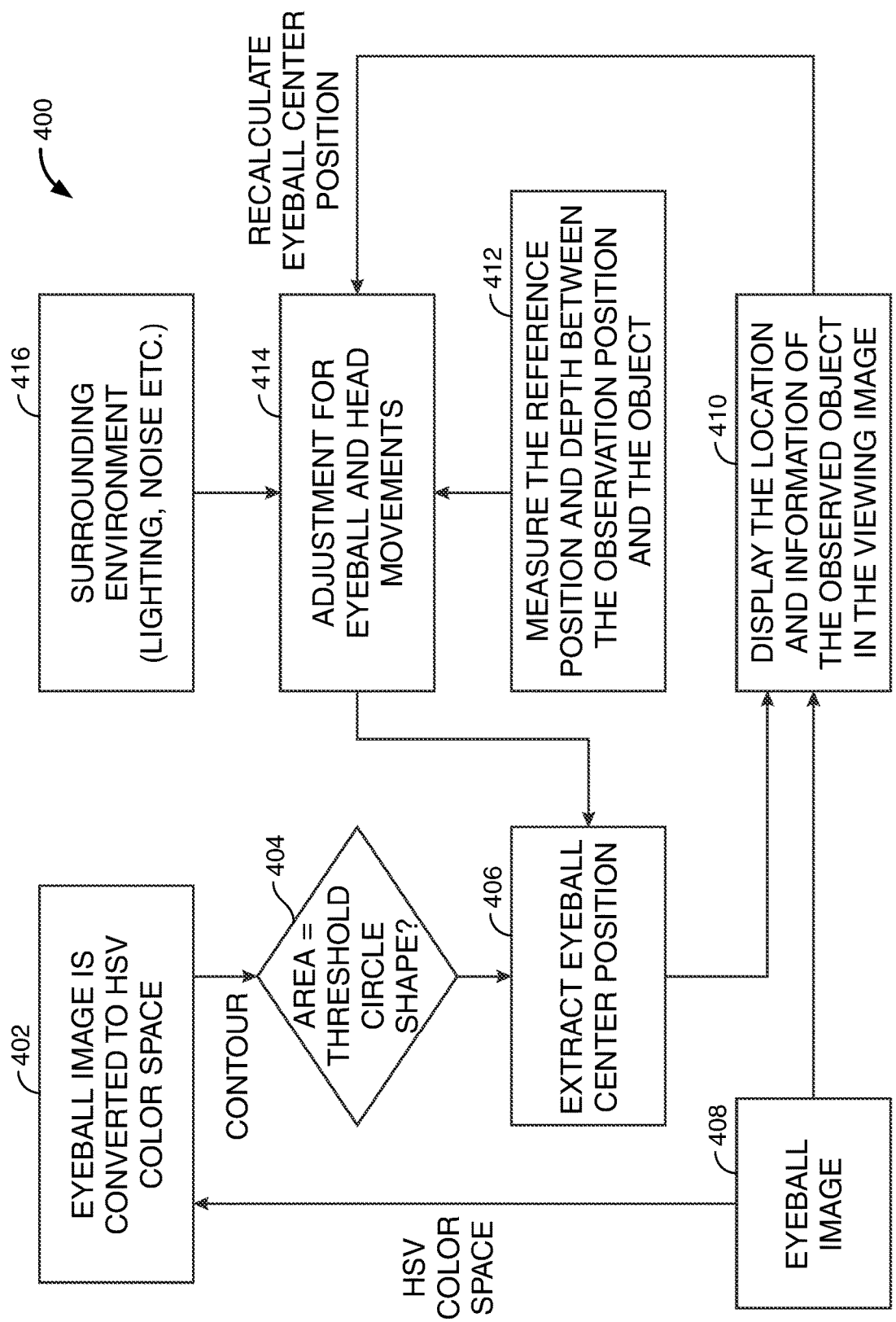
FIG. 4 shows illustrative systems and methods in accordance with principles of the disclosure.

FIG. 4 shows an illustrative embodiment 400 of a schematic showing data for the calibration and tracking process for detecting eyeball center position and tracking the center position of the object observed from that eyeball center position, in accordance with the principles of the disclosure.

The smart glasses may produce an eyeball image 408. Using hue, saturation, and value ("HSV") color space, the eyeball image 408 may convert to HSV color space 402. In addition, the smart glasses may display the location and information of the observed object in the viewing image 410. Following the conversion to HSV color space, a contour may apply to determine whether the eyeball tracking area is equal to a threshold circle shape 404. From there, the smart glasses extract eyeball center position 406.

After the smart glasses may display the location and information of the observed object in the viewing image, the user may want to recalculate eyeball center position. To recalculate eyeball center position, the smart glasses adjust for eyeball and head movements 414. In accordance with that step, the smart glasses measure the reference position and depth between the observation and the object 412. The surrounding environment (lighting, noise, etc.) 416 also plays a role in how the smart glasses adjust for eyeball and head movements 414. Following the adjustment for eyeball and head movements 414, the smart glasses extract eyeball center position 406. After the smart glasses extract eyeball center position 406, the smart glasses may display the location and information of the observed object in the viewing image 410 and repeat to recalculate eyeball center position.

FIG. 5 shows an illustrative sample UI block element grid of a UI webpage 500 in accordance with the principles of the disclosure. The UI block element grid may be any size. Exemplary sizes include 10×10, 100×100, and 1000×1000.

Grid display 502 may be represented by rows and columns of dotted or undotted lines. The grid display 502 may be superimposed over an intelligent UI webpage involving, for example, Bank A and prompts users, inter alia, to open a checking account. The grid display 502 may be a 10×10 grid, 100×100 grid, or any sized grid. The grid display 502 may be further broken into blocks, which are areas or regions on the webpage. For example, Block No. 3×8 504 is one block within grid display 502, which is a 9×10 grid.

Figure 6:
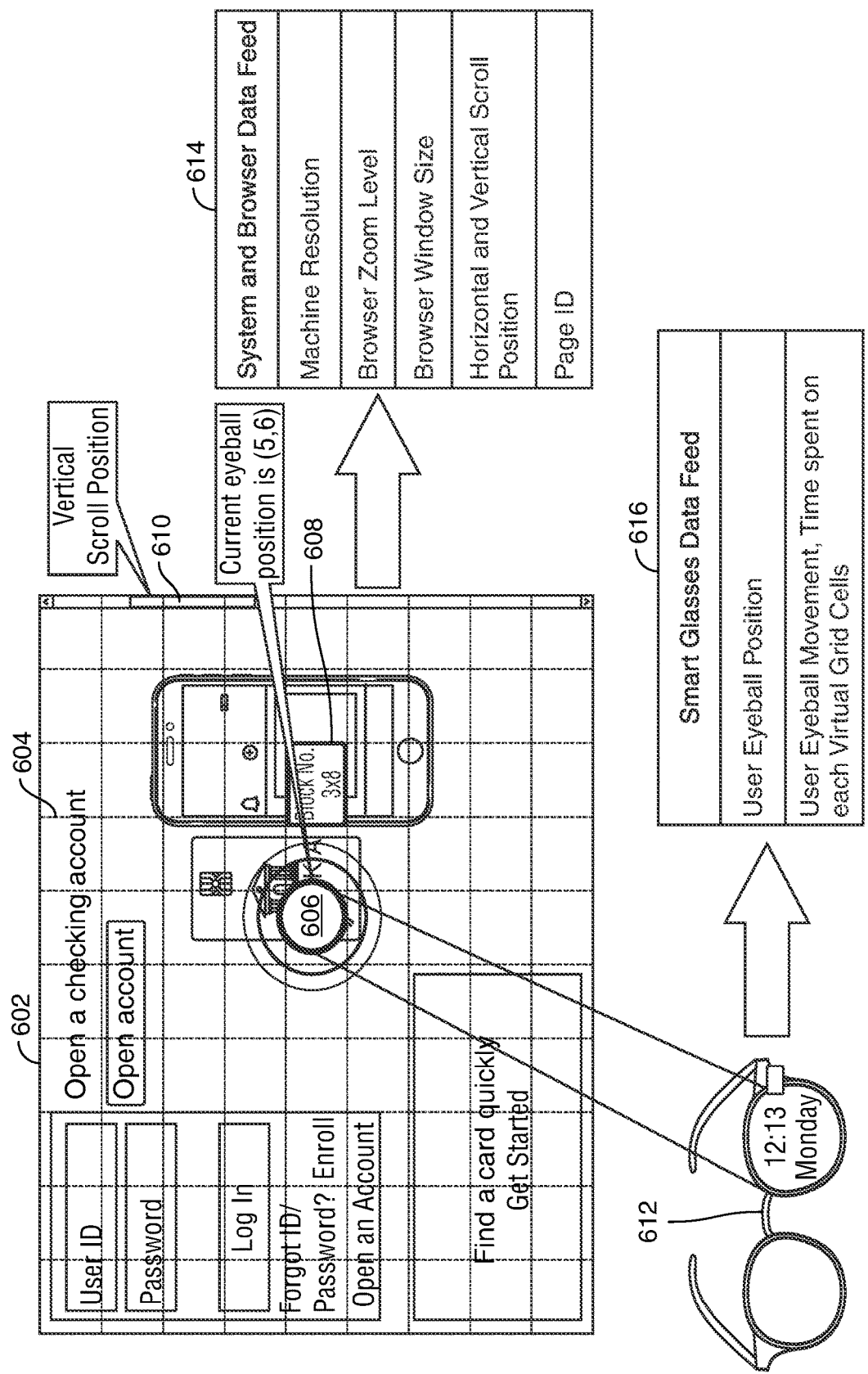
FIG. 6 shows illustrative systems and methods in accordance with principles of the disclosure.

FIG. 6 shows an illustrative process schematic of a method for data stream collection from smart glasses and computer, in accordance with the principles of the disclosure. FIG. 6 contains both illustrative steps and numbered components.

Smart glasses 612 may be representative of the smart glasses described herein. Smart glasses of the present disclosure may be like or the same as smart glasses 612.

Smart glasses 612 (with timestamp 12:13 Monday) may be worn by a user to detect user eyeball movement using HOE. From there, a smart glasses data feed 616 may stream data regarding user eyeball position and user eyeball movement, including time spent on each virtual grid cell (i.e., each UI block element).

Smart glasses 612 may detect eyeball movement with current eyeball position (5,6) within a circular region 606.

The circular region 606 may represent the eyeball movement region located within grid display 604 over intelligent UI webpage 602. The vertical scroll position 610 may also be measured. In this case, the current eyeball position is located within the (5,6) block element on the grid. Block No. 3×8 608 is an example of a UI block element within grid display 604.

From the UI webpage 602, and data provided by smart glasses 612, a system and browser data feed 614 is generated. The system and browser data feed 614 includes, but is not limited to, machine resolution, browser zoom level, browser window size, horizontal and vertical scroll position, and page ID.

Figure 7:
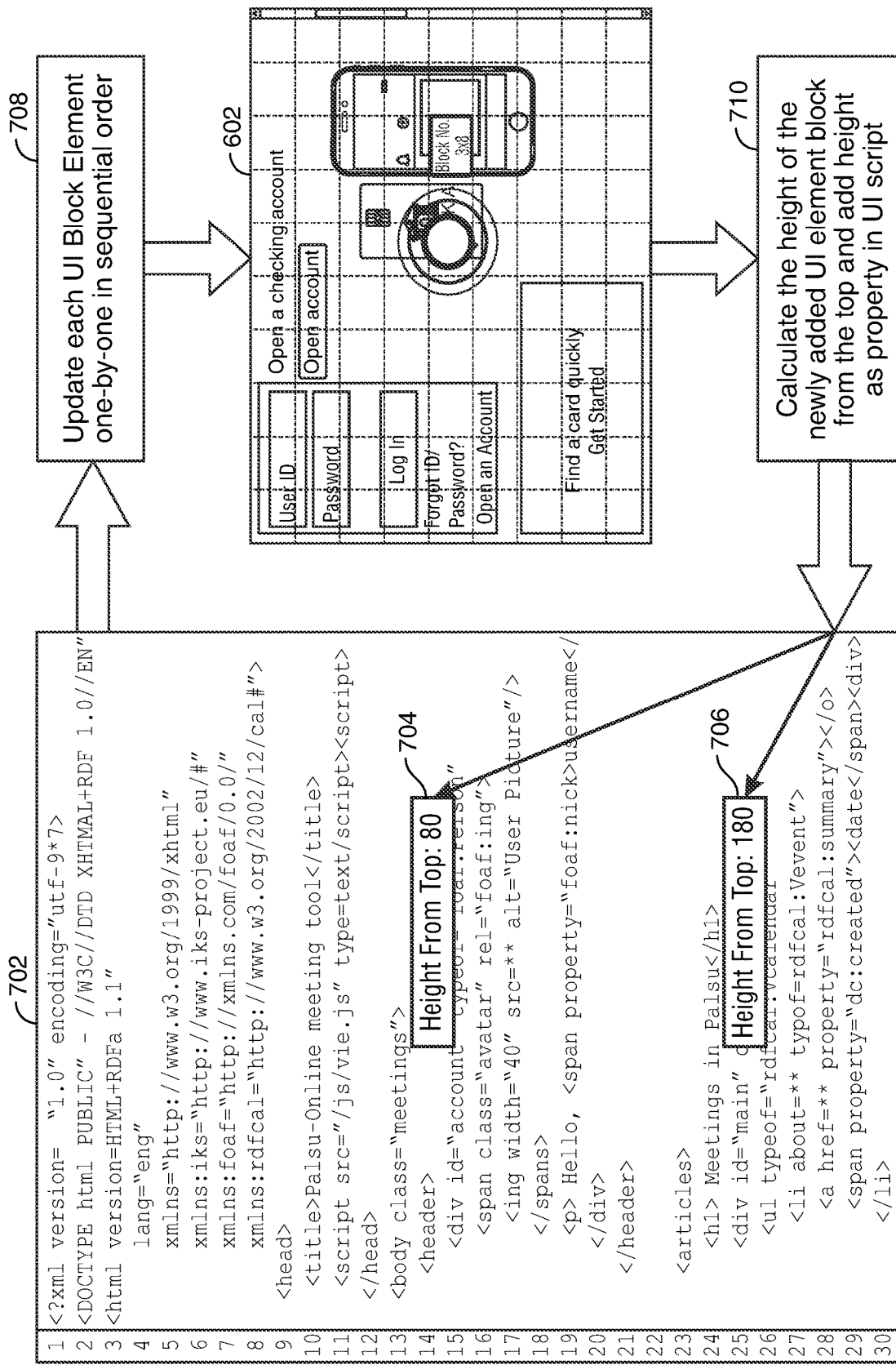
FIG. 7 shows an illustrative system in accordance with principles of the disclosure.

FIG. 7 shows an illustrative flow diagram for adding UI block element height for each UI block element, in accordance with the disclosure. In FIG. 7, an eyeball movement sensor may detect an eyeball movement region on intelligent UI webpage 602.

The intelligent UI webpage 602 may then initiate step 710 to "Calculate the height of the newly added UI block element from the top and add height as property in UI script."

Then, the code elements "Height From Top: 80" 704 and "Height From Top: 180" 706 may be updated in the UI webpage code 702.

Step 708 to "Update each UI Block Element one-by-one in sequential order" follows. In step 708, each UI block element on UI webpage 602 may be updated sequentially one-by-one, either by appending or deleting information, based on the information gathered by the system. The UI webpage code 702 may update continuously to reflect the new UI block elements in sequential order, and, as such, the UI webpage 602 display may be updated, accordingly. The process may repeat until a user completes viewing the UI webpage 602.

Each of steps 702, 704, 706, 708, and 710 may run on smart glasses. In some embodiments, each of steps 702, 704, 706, 708, and 710 may be executed on a remote server.

UI webpage 602 may have a newly added UI block element in the form of a block region, near, for example, Block No. 3×8. During step 710, the activated UI webpage 602 may calculate the height of the newly added UI block element from the top and add height as property in the UI script, i.e., UI back-end code. The data from the smart glasses' calculation is then sent to a UI back-end code 702.

The UI back-end code 702 may be modified based on the smart glasses' calculation. For example, the "Height From Top: 80," 704 may be modified to "Height From Top: 180," 706.

After the UI back-end code 702 is modified, the smart glasses may update each UI block element one-by-one in sequential order. The UI webpage 602 may then update to reflect the changes made to the UI back-end code 702 based on the eyeball movement tracking.

Figure 8:
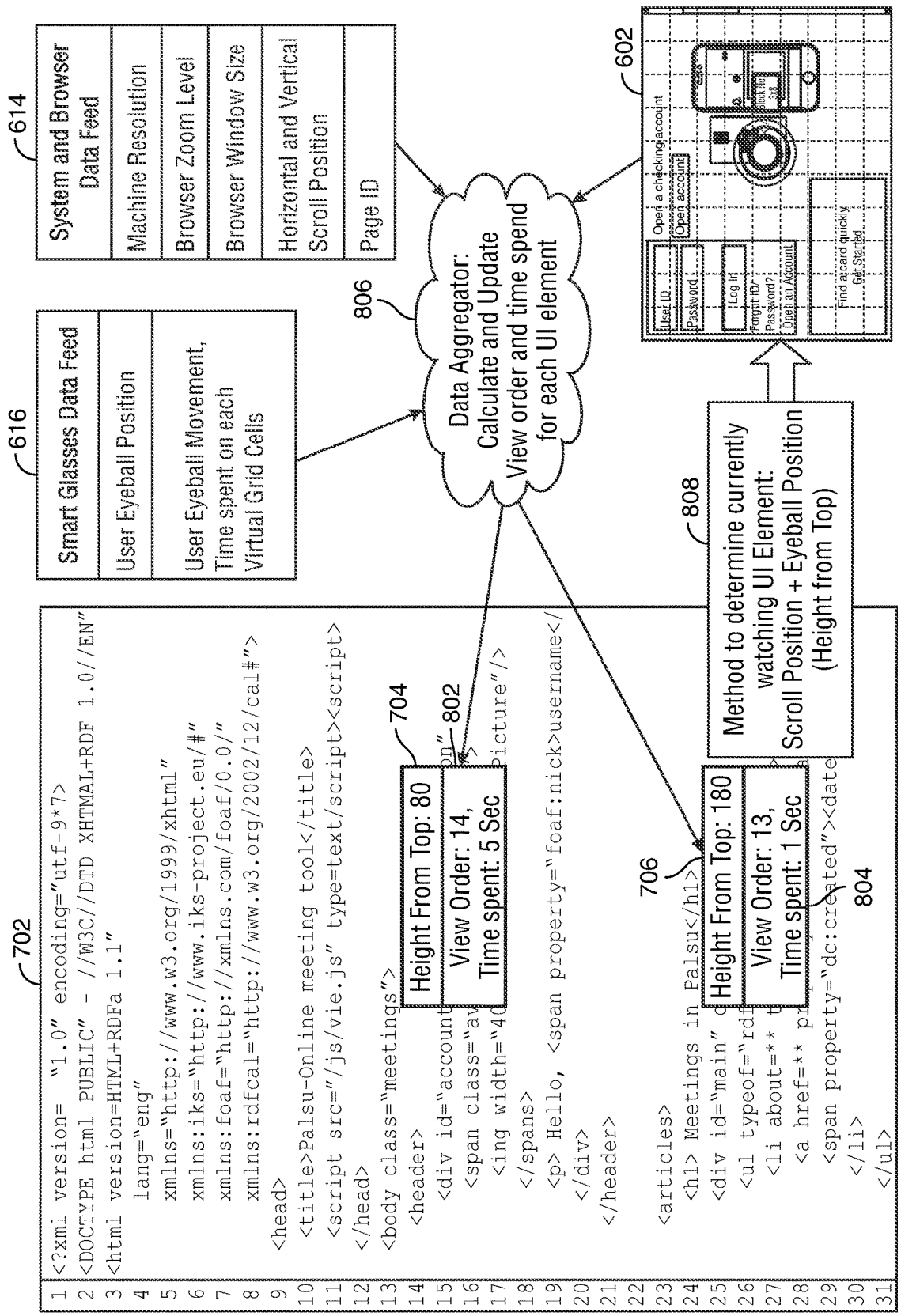
FIG. 8 shows an exemplary diagram in accordance with principles of the disclosure.

FIG. 8 shows an exemplary diagram 800 for calculating UI block element view order ("VO") and time spent ("TS").

When smart glasses are activated to begin capturing eyeball movement, an intelligent UI webpage 602 with grid display and eyeball movement region over UI block element may be formed. The UI webpage 602 may be generated based on the smart glasses data feed 616 including, but not limited to, user eyeball position and user eyeball movement including time spent on each virtual grid cell, as well as system and browser data feed 614 including, but not limited to, machine resolution, browser zoom level, browser window size, horizontal and vertical scroll position, and page ID.

From the data provided from the smart glasses data feed 616 and the system and browser data feed 614, a data aggregator 806 calculates and updates the VO and TS for each UI block element. From the data aggregator 806, the UI back-end code 702 is again modified, for example, "Height From Top: 80," 704 is added below with, for example, "View Order: 14, Time Spent: 5 Sec," 802. In addition, "Height From Top: 180," 706 is added below with, for example, "View Order: 13, Time Spent: 1 Sec," 804.

A method to determine the currently watched UI block element based on scroll position and eyeball position (height from top) 808 may also be applied to UI webpage 602. Thus, data aggregator 806 may provide accurate and reliable data.

In some embodiments, the user may manually input information into the UI. The smart glasses may operate simultaneously to a user manually inputting information into the UI. Further, a user may override the system if necessary.

Additionally, the smart glasses may verify the user of the smart glasses before activating eyeball tracking. The smart glasses may include an authentication application. User authentication may be based on one or more biometric factors, behavioral factors, touch, air, eye movements, or any suitable method or combination of methods. Illustrative biometric factors include eye, pupil, and iris recognition. Illustrative behavioral features include gait, head movements, and eye movements.

Eye scan recognition may automatically enable the user of the smart glasses to be authenticated. The system may be enabled to automatically recognize the eye scan without the need for another device.

Figure 9:
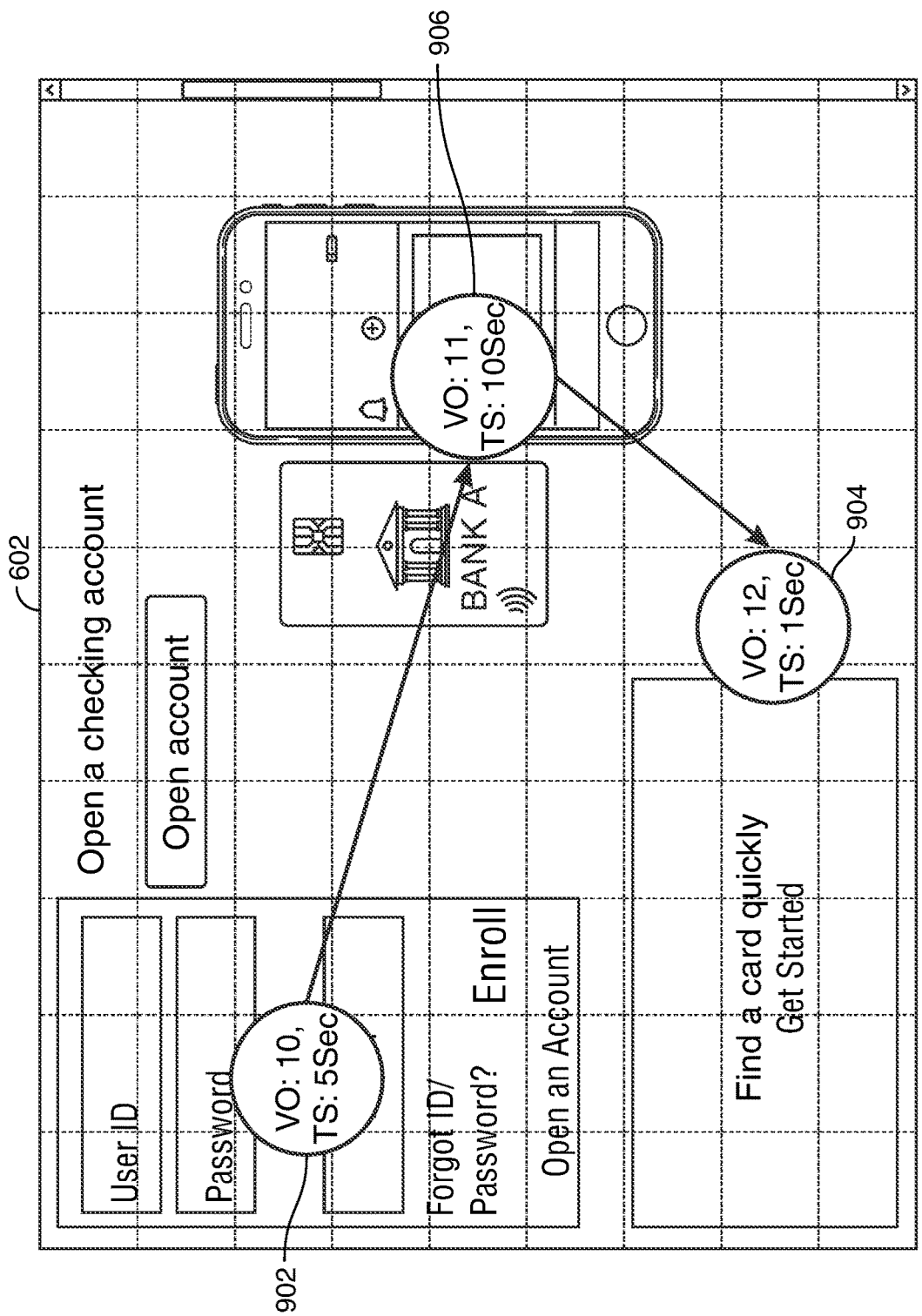
FIG. 9 shows an illustrative diagram in accordance with principles of the disclosure.

FIG. 9 shows an illustrative diagram in accordance with principles of the disclosure. The illustrative diagram shows an exemplary UI webpage 602 incorporated with UI block element VO, TS, and navigation pattern.

In this example, the view order goes from "VO: 10, TS: 5 Sec," 902 to "VO: 11, TS: 10 Sec," 906 to "VO: 12, TS: 1 Sec," 904.

The VO number is the order in which a user viewed that UI block element. The TS number is user time spent viewing a given UI block element in seconds.

Figure 10:
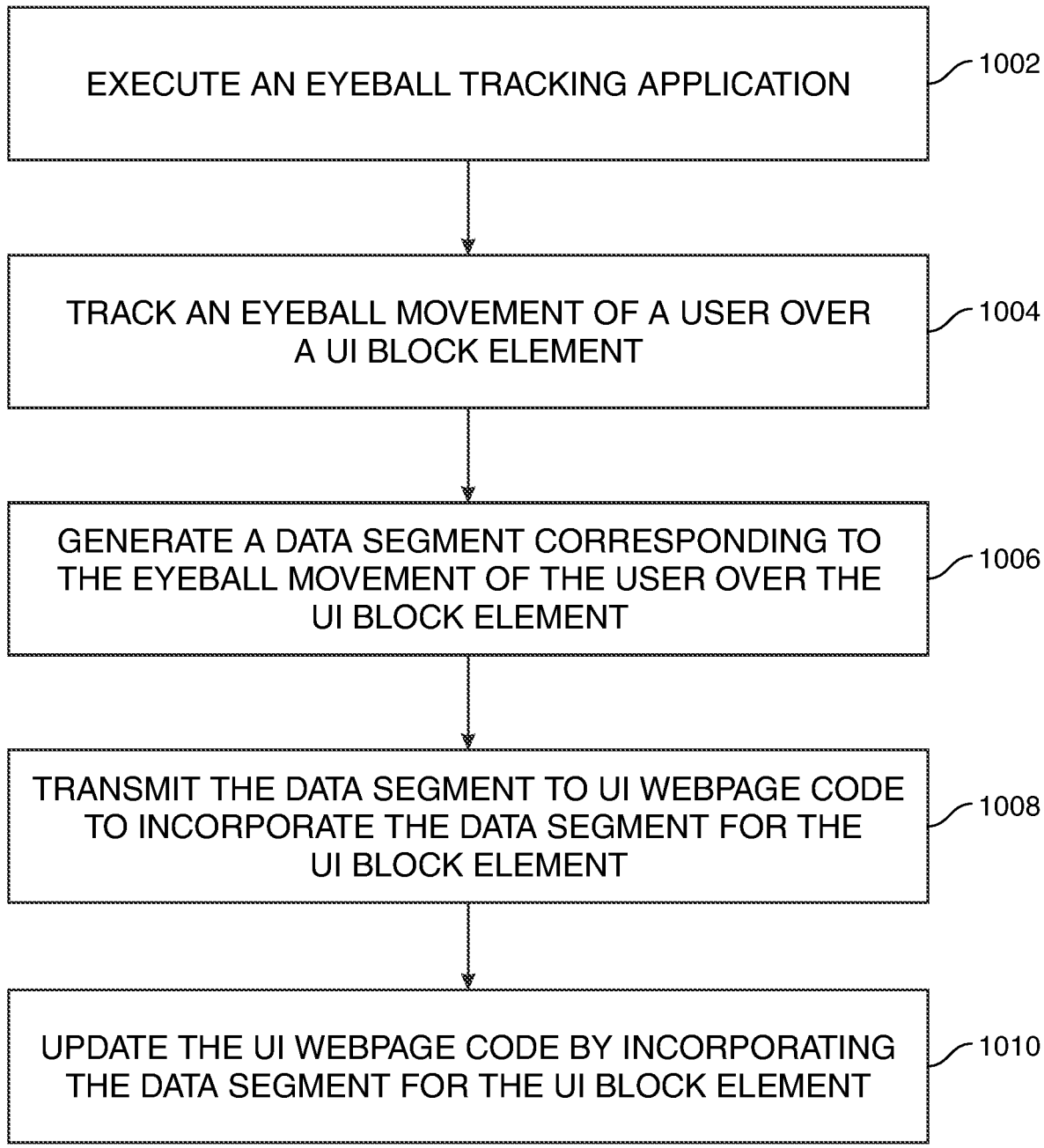
FIG. 10 shows an illustrative flowchart in accordance with principles of the disclosure.

FIG. 10 shows an illustrative flowchart in accordance with principles of the disclosure. The illustrative flowchart shows a method of using smart glasses configured for capturing data from a user and transmitting the data to a UI webpage, the UI webpage controlled by UI webpage code, the smart glasses located on a user.

The illustrative flowchart shows a method beginning with step 1002, to execute an eyeball tracking application. This step may initiate an eyeball tracking application to begin collecting data from an eyeball movement sensor within the smart glasses.

The next step 1004 may enable the eyeball tracking application to track the eyeball movement of the user over a UI block element. This step may enable aggregation of information regarding the user eyeball movement over each UI block element in a UI webpage.

Following, step 1006 may generate a data segment corresponding to the eyeball movement of the user over the UI block element. This data segment may contain view time and view order of a user over a given UI block element, in addition to the content of the given UI block element.

Then, step 1008 may transmit the data segment to the UI webpage code to incorporate the data segment for the UI block element. The UI webpage code may be located internally (within the smart glasses) or externally (on a terminal or service remote to the smart glasses).

Finally, step 1010 may update the UI webpage code by incorporating the data segment for the UI block element. Updating the UI webpage code may include appending, deleting, or editing information within the UI webpage code. The UI webpage code incorporates the aggregated data from the user viewing each UI block element in a UI webpage. The UI webpage is then updated, according to the updated UI webpage code supporting the UI webpage.

Thus, methods and apparatus for an intelligent webpage optimized with smart glasses are provided. The present disclosure may be practiced by any means other than the described embodiments, which are presented for purposes of illustration rather than of limitation, and that the present disclosure is limited only by the claims that follow.

What is claimed is:

1. Smart glasses configured for capturing data from a user and transmitting the data to a user interface ("UI") webpage, the UI webpage controlled by UI webpage code, the smart glasses located on a user, the smart glasses comprising:
   a camera operable to capture data from an eyeball movement of a user;
   a memory for storing the data captured from the eyeball movement of the user;
   a sensor configured to capture the eyeball movement of the user;
   a transceiver configured to enable communication between the smart glasses and an eyeball tracking application;
   a processor operable to capture, store, and transmit data to the UI webpage; wherein, when the sensor detects a point of movement of the eyeball of the user, the processor is operable to:
      execute the eyeball tracking application configured to:
         track the eyeball movement of the user over a UI block element;
         generate a data segment corresponding to the eyeball movement of the user over the UI block element; and
         update the UI webpage code by incorporating the data segment into the UI block element.

2. The smart glasses of claim 1 wherein the eyeball tracking application is further configured to:
   determine an amount of time ("TS") the eyeball of the user spends gazing at the UI block element;
   determine a view order ("VO") in which the user gazes at the UI block element; generate a data segment corresponding to the TS and VO determined;
   transmit the data segment to the UI webpage code to incorporate the data segment into the UI block element; and
   update the UI webpage code by incorporating the data segment into the UI block element.

3. The smart glasses of claim 1 wherein the camera comprises a scattering waveguide holographic optical element ("HOE").

4. The smart glasses of claim 1 wherein an eyeball image representing the eyeball movement of the user is produced on the UI webpage.

5. The smart glasses of claim 4 wherein the eyeball image is converted to hue, saturation, and value ("HSV") color space, and, following the conversion to HSV color space, a contour is applied to the eyeball image to determine whether an eyeball tracking area over the eyeball movement of the user is equal to a threshold circular area.

6. The smart glasses of claim 1 wherein the smart glasses extract an eyeball center position.

7. The smart glasses of claim 1 wherein the smart glasses display the location and information of an observed object in a viewing image on the UI webpage.

8. The smart glasses of claim 7 wherein the user recalculates an eyeball center position, by making an adjustment for user eyeball and head movement, a reference position and depth between an observation and an object, and surrounding environment comprising lighting and noise.

9. The smart glasses of claim 1 wherein a grid display is represented by rows and columns of dotted lines, the grid display is superimposed over the UI webpage, and the grid display is divided into UI block elements.

10. The smart glasses of claim 2 wherein the UI webpage is incorporated with the UI block elements comprising the VO, the TS, and a navigation pattern, and wherein the UI webpage is incorporated with a smart glasses data feed comprising user eyeball position, user eyeball movement including time spent on each virtual grid cell, and incorporated with a system and browser data feed comprising machine resolution, browser zoom level, browser window size, horizontal and vertical scroll position, and page ID.

11. A method of using smart glasses configured for capturing data from a user and transmitting the data to a UI webpage, the UI webpage controlled by UI webpage code, the smart glasses located on a user, the method comprising:
execute an eyeball tracking application configured to:
track the eyeball movement of the user over a UI block element;
generate a data segment corresponding to the eyeball movement of the user over the UI block element;
transmit the data segment to the UI webpage code to incorporate the data segment for the UI block element; and
update the UI webpage code by incorporating the data segment for the UI block element.

12. The method of claim 11 wherein the eyeball tracking application is further configured to:
determine an amount of time (TS) the user spends gazing at the UI block element;
determine an order (VO) the user viewed the UI block element; and
generate a data segment corresponding to the TS and VO determined;
transmit the data segment to the UI webpage code to incorporate the data segment for the UI block element; and
update the UI webpage code by incorporating the data segment for the UI block element.

13. The method of claim 11 wherein the camera comprises a scattering waveguide HOE.

14. The method of claim 11 wherein an eyeball image representing the eyeball movement of the user is produced on the UI webpage.

15. The method of claim 14 wherein, using HSV color space, the eyeball image is converted to HSV color space, and, following the conversion to HSV color space, a contour is applied to determine whether an eyeball tracking area over the eyeball movement of the user is equal to a threshold circular area.

16. The method of claim 11 wherein the smart glasses extract an eyeball center position.

17. The method of claim 11 wherein the smart glasses display the location and information of an observed object in a viewing image on the UI webpage.

18. The method of claim 17 wherein the user recalculates an eyeball center position, by making an adjustment for user eyeball and head movement, a reference position and depth between an observation and an object, and surrounding environment comprising lighting and noise.

19. The method of claim 11 wherein a grid display is represented by rows and columns of dotted line, the grid display is superimposed over the UI webpage, and the grid display is divided into blocks.

20. The method of claim 12 wherein the UI webpage is incorporated with the UI block elements comprising VO, TS, and navigation pattern, and wherein the UI webpage is incorporated with a smart glasses data feed comprising user eyeball position, user eyeball movement including time spent on each virtual grid cell, and a system and browser data feed comprising machine resolution, browser zoom level, browser window size, horizontal and vertical scroll position, and page ID.

* * * * *